United States Patent
Hollender et al.

(10) Patent No.: US 7,866,611 B2
(45) Date of Patent: Jan. 11, 2011

(54) CABLE MOUNTING BRACKET

(75) Inventors: John E. Hollender, Chicago, IL (US); James J. Schmidt, II, Bolingbrook, IL (US); Keith D. Alsberg, Chicago, IL (US)

(73) Assignee: Metropolitan Air Technology, Chicago, IL (US)

( * ) Notice: Subject to any disclaimer, the term of this patent is extended or adjusted under 35 U.S.C. 154(b) by 79 days.

(21) Appl. No.: 11/786,499

(22) Filed: Apr. 12, 2007

(65) Prior Publication Data

US 2008/0251652 A1 Oct. 16, 2008

(51) Int. Cl.
*F16L 3/08* (2006.01)
(52) U.S. Cl. ...................................... 248/67.7
(58) Field of Classification Search .............. 248/49, 248/56, 57, 65, 68.1
See application file for complete search history.

(56) References Cited

U.S. PATENT DOCUMENTS

| | | | | |
|---|---|---|---|---|
| 3,131,447 A | * | 5/1964 | Tinnerman | 248/231.81 |
| 3,178,138 A | * | 4/1965 | Hessdoerfer et al. | 248/539 |
| 4,115,779 A | | 9/1978 | Dantzler et al. | |
| 4,350,839 A | * | 9/1982 | Lass | 174/661 |
| 4,829,845 A | | 5/1989 | Suzuki | |
| 4,967,987 A | | 11/1990 | Swank | |
| 5,353,857 A | * | 10/1994 | Anderson | 160/178.1 R |
| 5,370,345 A | * | 12/1994 | Condon | 248/65 |
| 5,971,335 A | * | 10/1999 | Perrin et al. | 248/311.2 |
| 6,454,311 B1 | * | 9/2002 | Berry | 285/61 |
| 6,666,415 B2 | * | 12/2003 | Hansen | 248/74.3 |
| 6,889,443 B2 | * | 5/2005 | Polk, Jr. | 33/562 |
| 6,996,943 B2 | | 2/2006 | Denier et al. | |
| 7,025,314 B1 | | 4/2006 | Thomas et al. | |
| 2005/0263983 A1 | | 12/2005 | Saul | |
| 2007/0052188 A1 | | 3/2007 | Steadman | |

\* cited by examiner

*Primary Examiner*—Terrell Mckinnon
*Assistant Examiner*—Erin Smith
(74) *Attorney, Agent, or Firm*—Ice Miller LLP

(57) ABSTRACT

A bracket for mounting a cable to a surface is presented. The bracket restricts lateral and longitudinal movement of a cable while enabling rotational movement. The bracket may be mounted to a first surface so that the cable may be inserted into a second surface. The bracket generally includes a mounting portion, first and second flanges, and an arm. To reduce longitudinal movement of the cable, the cable is inserted through the first flange and fixedly coupled to a ferrule, which is coupled between the second flange and the notch of the arm. To restrict lateral movement of the cable, a first flange includes a tab that when in a raised position, enables the cable to be inserted through the first flange. After which, the tab is lowered to reduce the size of the aperture. The bracket may also include a cap that is fixedly removable from the cable.

17 Claims, 5 Drawing Sheets

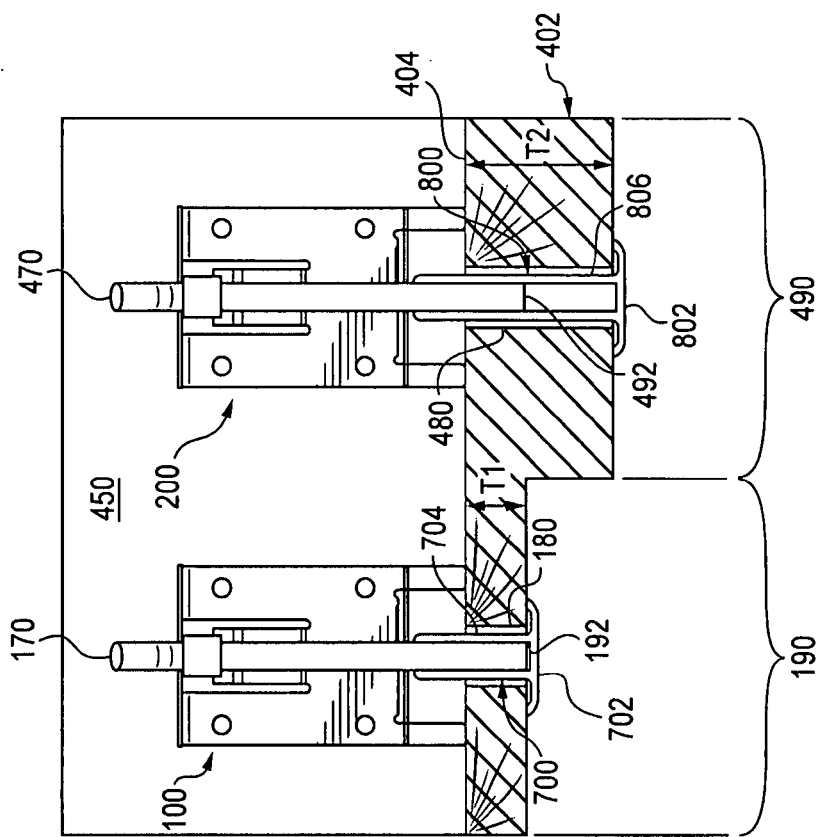
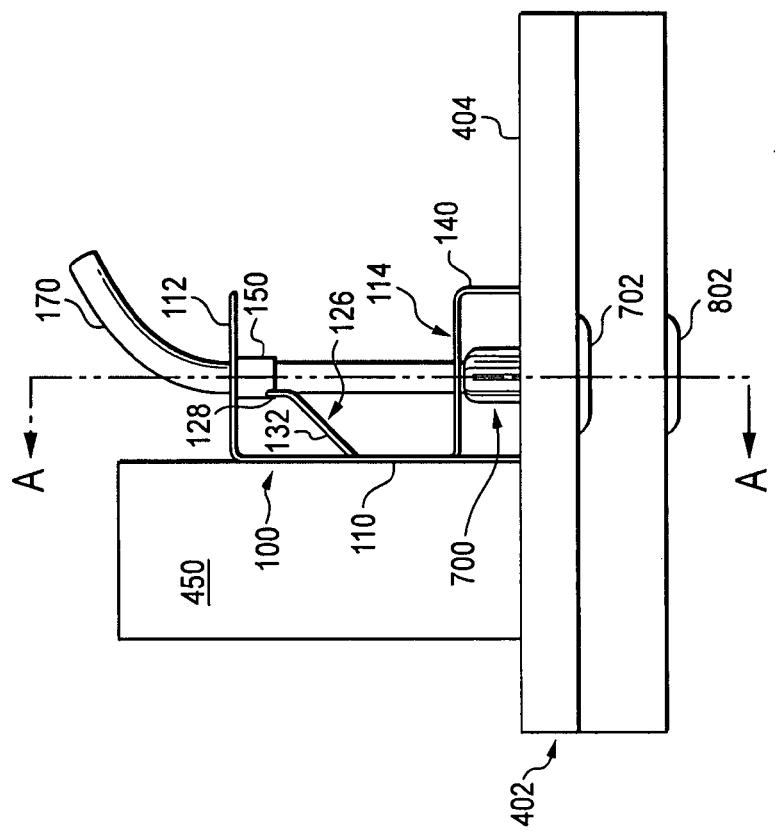

CABLE MOUNTING BRACKET

BACKGROUND

Push-pull cables have been used in many applications. For example, they may be used to adjust dampers in air processing systems to provide regulation of the air flow to various ducts of the system. However, these push-pull cables tend to buckle when they are subjected to large forces. To help avoid this problem, torque-type cables can be used. These cables are twisted to instead of being pushed or pulled. In order to install these torque-type cables to a surface, their lateral and longitudinal movement can be restricted. However, the rotational movement of the torque-type cables should not be restricted.

SUMMARY

A bracket for mounting a cable to a surface is presented. The mounting bracket restricts lateral and longitudinal movement of a cable while permitting the cable to rotate within the mounting bracket. The mounting bracket may be used, for example, to mount the cable for a variety of torque-translating applications. In some cases, the mounting bracket is mounted to a first surface in a manner that enables the cable to be inserted into a second surface. The mounting bracket may be made from a corrosion and fire resistant material. It may also or alternatively be made from a plastic, composite material or a metal such as, steel, copper and brass.

The mounting bracket generally includes a mounting portion, first and second flanges, and an arm. The mounting portion includes apertures via which the bracket may be mounted to the surface. The first flange and second flange each include an aperture through which the cable is inserted. To reduce longitudinal movement of the cable, the mounting portion may include an arm that includes an angled portion that extends away from the mounting portion. The cable may be fixedly coupled with a ferrule that is coupled between the second flange and the notch of the arm. This enables the cable to rotate but not move in a lateral direction. In addition, the aperture in the second flange reduces the lateral movement of the cable. To provide further lateral support to the cable, the first flange includes a tab. When the tab is in a raised position, the cable may be inserted through the aperture of the first flange. After insertion of the cable, the tab is lowered to reduce the size of the aperture. This further restricts lateral movement of the cable while enabling the cable to rotate.

To provide additional support for the mounting bracket, the mounting portion may include one or more legs that can rest on a second surface. In addition, the first flange may include an angled portion that can rest on the second surface. The mounting bracket may also include a cap. The cap is generally inserted into the aperture in the second surface and coupled to the end of the cable via a connection such as a friction fit. This not only provides additional support for the cable but covers the hole to hide both the hole and the cable.

In order to mount a cable to a surface, the mounting bracket is secured to a first surface. The cable is inserted through the aperture in the second flange, a ferrule, the aperture in the first flange and the aperture in a second surface. The ferrule is fixedly coupled to the cable and coupled between the second flange and the notch in the arm of the mounting bracket. The tab on the first surface is lowered to reduce the size of the aperture in the first flange. A cap may be inserted through the aperture in the second surface and secured to the end of the cable.

BRIEF DESCRIPTION THE DRAWINGS

The invention can be better understood with reference to the following drawings and description. The components in the figures are not necessarily to scale. In the drawings:

FIG. 1. is an isometric view of a mounting bracket including a raised tab;

FIG. 2. is an isometric view of the mounting bracket of FIG. 1, wherein the tab is lowered;

FIG. 3. is a top plan view of a mounting cap as stamped from a sheet of material;

FIG. 5 is a side plan view of the installed mounting brackets of FIG. 4;

FIG. 6 is a front cross-sectional view of the installed mounting brackets of FIG. 4.

DETAILED DESCRIPTION

Figure 2:
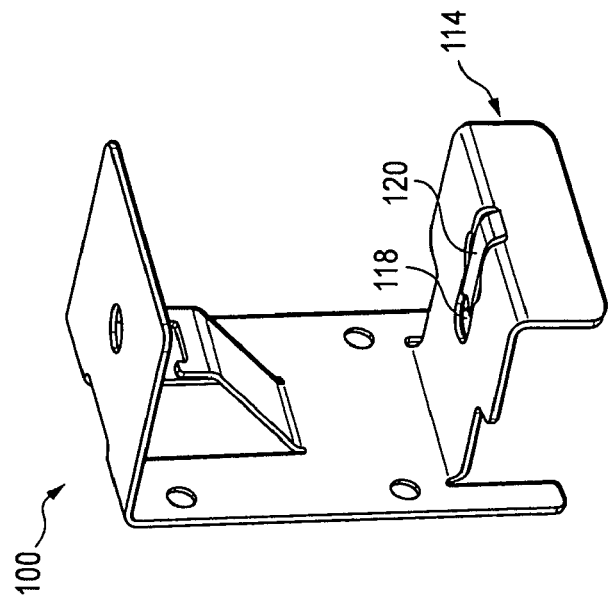
Figure 1:
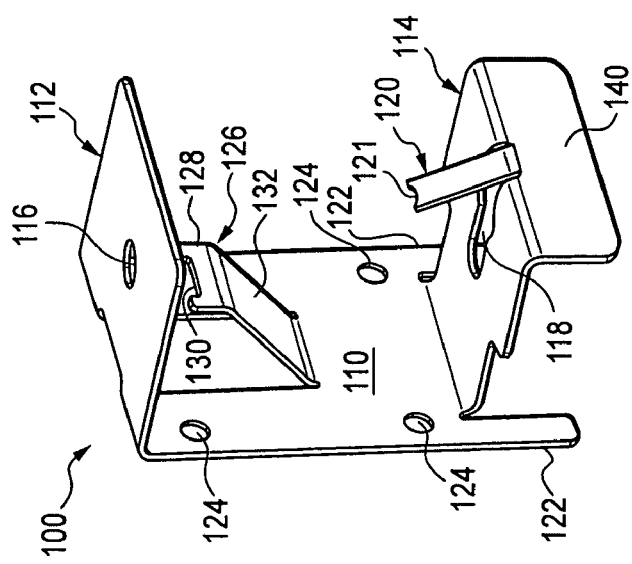

FIG. 1 illustrates a bracket 100 for mounting a cable to a surface. The mounting bracket 100 restricts lateral and longitudinal movement of a cable while permitting the cable to rotate within the mounting bracket 100. For example, the mounting bracket 100 may be used to mount cables for torque-translating applications such as, heating, ventilation and air conditioning (HVAC) systems, vehicular heating systems, tools, and remote operation of oil drains. The bracket 100 generally includes a mounting portion 110, first and second flanges 112 and 114, and an arm 126. The mounting portion may include mounting apertures 124 and one or more legs 122. The first flange 112 includes an aperture 116. The second flange 114 includes a tab aperture 118 and a tab 120 with a tab notch 121. The arm 126 generally includes an angled portion 132 and a notched portion 128 that includes a notch 130. The second flange 114 may also include a bent portion 140. As shown in FIG. 1, the tab 120 is shown in a raised position. As shown in FIG. 2, the tab 120 may be lowered to reduce the size of the tab aperture 118.

Figure 3:
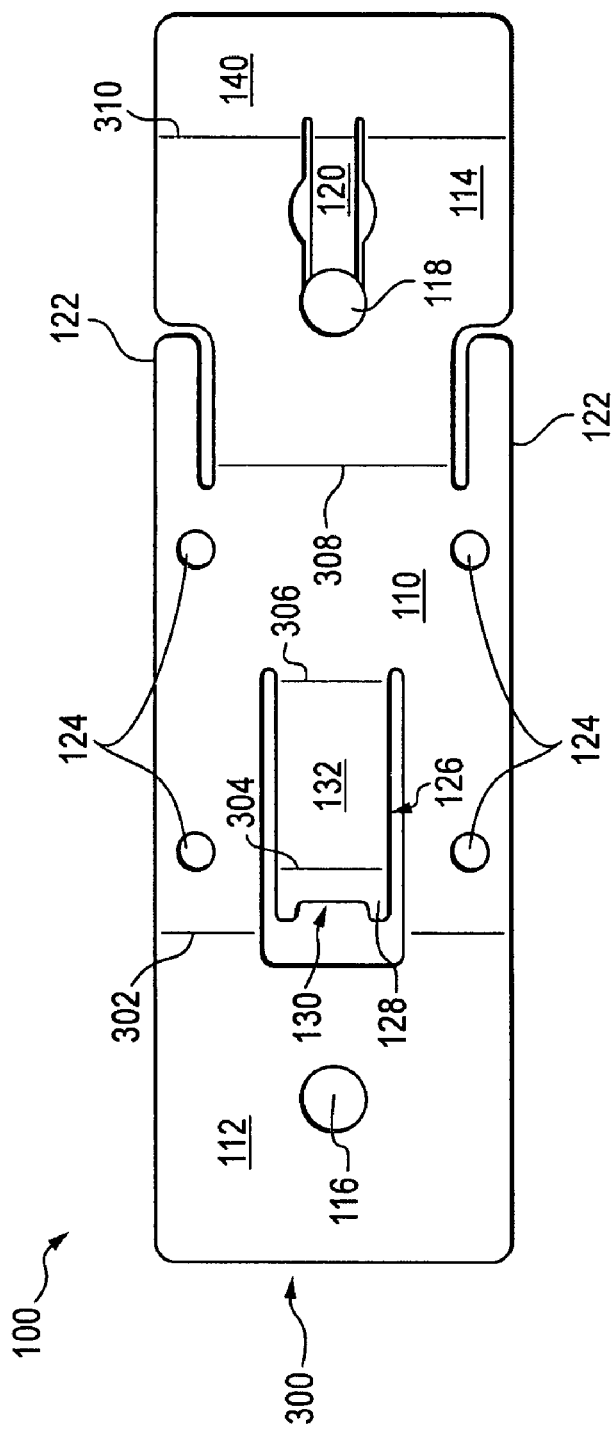

The mounting bracket 100 may be created from a single sheet of material. For example, the mounting bracket 100 may be stamped from a material such as, metal, engineered plastic, a composite material and/or any type of corrosion and/or fire resistant material. The metal may include steel, brass and copper. The material may be stamped to produce the shape 300 shown in FIG. 3. The shape 300 includes the following elements of the mounting bracket 100: the cable aperture 116, mounting apertures 124, arm 126, notch 130 in the arm, legs 122, and tab aperture 118. After the material is stamped into the shape 300, the material may be folded along lines 302, 304, 306, 308, and 310 to form the first flange 112, notched portion of the arm 128, mounting portion 110, angled portion of the arm 132, second flange 114, and bent portion 140 of the second flange 114, respectively.

Figure 4:
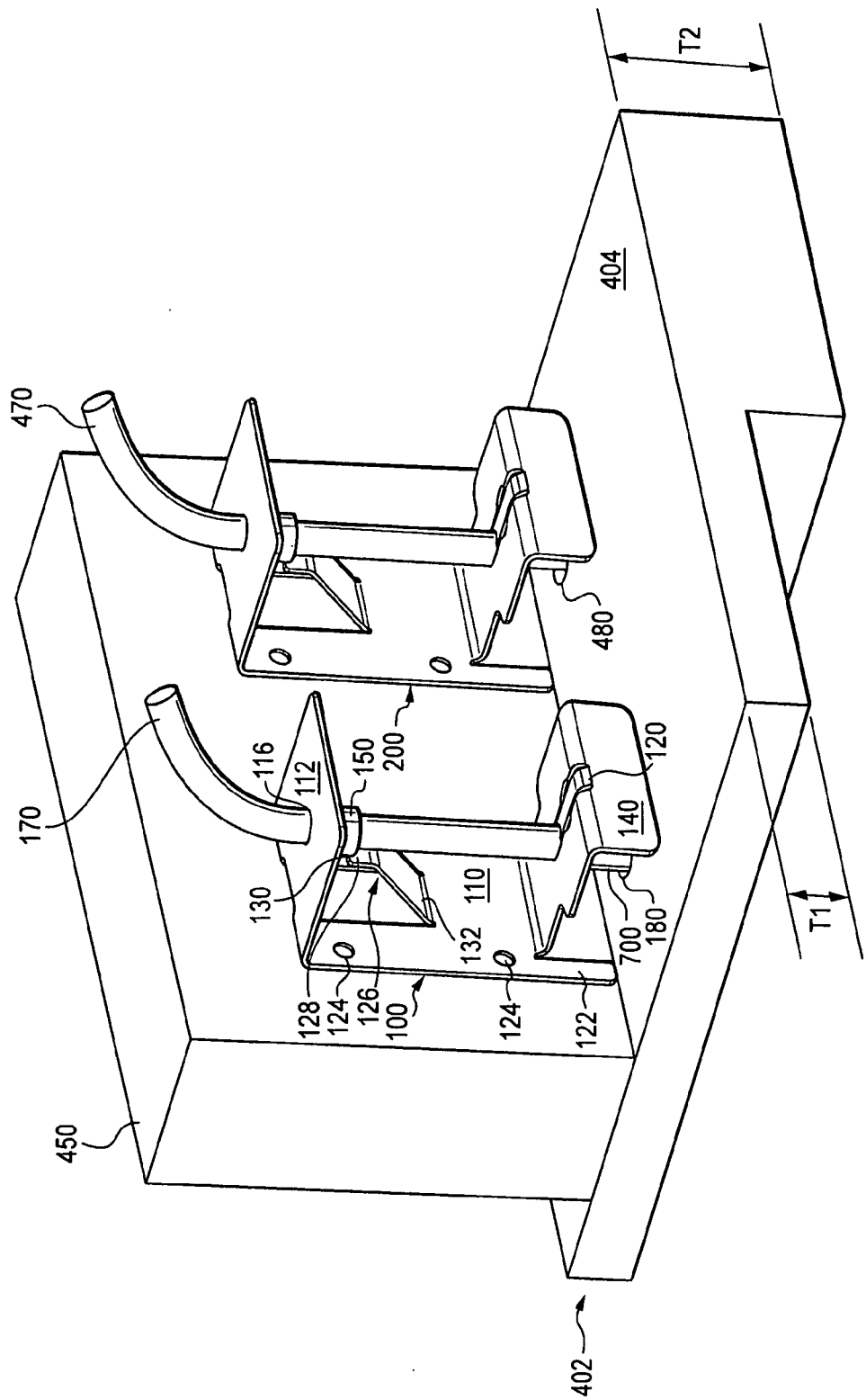
FIG. 4 is an isometric view of mounting brackets installed on a surface.

FIGS. 4-6 show mounting brackets 100, 200 mounting cables 170, 470, respectively to a surface 400. The mounting brackets 100, 200 restrict lateral and longitudinal movement of the cables 170, 470 while permitting the cables 170, 470 to rotate within the mounting bracket 100, 200 respectively. The example shown in FIGS. 4-6 relates to a cable activated damper control system that regulates air flow in heating and ventilation systems such as, HVAC (not shown). Such a system is disclosed in U.S. Pat. No. 5,702,298, which is hereby incorporated by reference. The control system uses a rotational cable to adjust a plenum thereby adjusting airflow in the HVAC system. A torque inducing tool such as, a wrench, nut driver, screwdriver or knob may be used to turn the cable.

In FIGS. 4-6, the mounting brackets 100, 200 are used to mount cables 170, 470 to a joist 450 located above a ceiling 402. The cables 100, 200 may also be mounted to other surfaces located above the ceiling 402. The description that follows is of mounting bracket 100. Except as indicated, the description relating to each element of mounting bracket 100 also applies to the corresponding elements in mounting bracket 200. The mounting portion 110 of the mounting bracket 100 may be mounted to the joist 450. For example, the mounting portion 110 may be secured to the joist 450 via the mounting apertures 124 using screws, nails, and/or bolts (not shown). The mounting portion 110 may also or alternatively be mounted to the joist or other surface via glue, welding or soldering. To provide additional support for the mounting bracket 100, the legs 122 and the bent portion 140 may rest on the upper surface of the ceiling 404.

To limit longitudinal and lateral motion of the cable 100, the cable is inserted through the aperture 116 of the first flange 112 and inserted through and secured to a ferrule 150. The ferrule 150 is served inserted into the notch 130 in the arm 126 so that the ferrule 150 is secured between the notch 130 and the first flange 112. The ferrule 150 may be crimped onto the cable 100.

Figure 7:
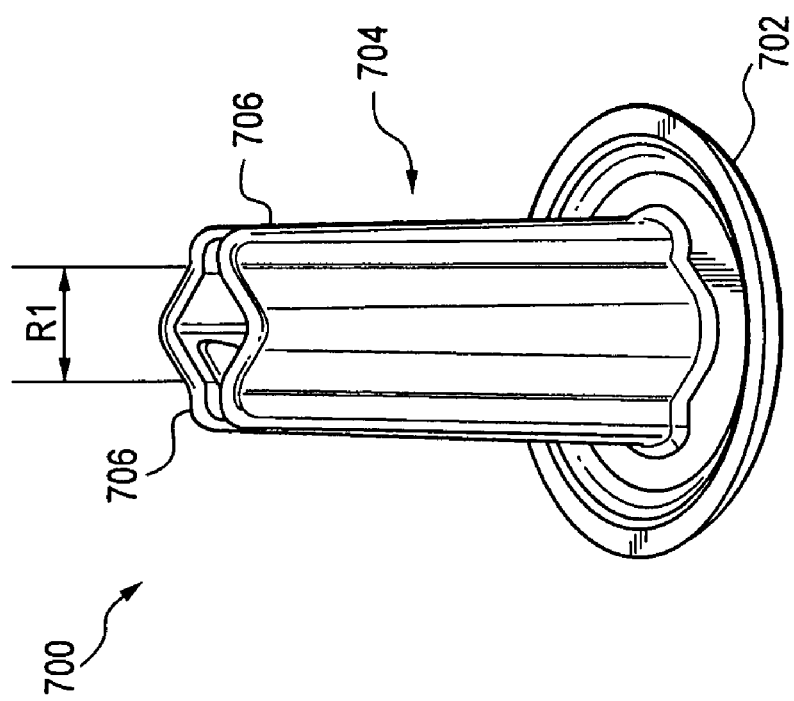
FIG. 7 is an isometric view of a cap.

The second flange 114 may be used to further limit lateral motion of the cable 170. With the tab 118 in the raised position (FIG. 1), the cable 170 may be inserted through the tab aperture 118 (FIG. 1) and into an aperture 108 in the ceiling 402. The tab 120 may be lowered to reduce the size of the tab aperture 118 to limit lateral movement of the cable 170. When the cable 170 is not in operation, a cap 700 may be inserted into the ceiling 402 and removably attached to the end of the cable 170 via, for example, a friction fit. As shown in FIG. 7, the cap 700 includes a head 702 and a body 704. The body 704 includes two or more flanges 706 (two are shown) that form a cylinder with a diameter R1. The flanges 706 are generally flexible and diameter R1 may be smaller than that of the cable 170 to provide a friction fit with the cable 170. This also provides additional lateral support to the cable 170. The head of the cap 702 may lay flush with the underside of the ceiling 402 to mask the aperture 180 (FIG. 4) in the ceiling 402 and the end of the cable 100.

The cap 700 may be used to accommodate cables of different lengths and ceilings of different thicknesses. As shown in FIG. 6, mounting brackets 100 and 200 secure cables 170 and 470, respectively, on the joist 450 and within the ceiling 402. To accommodate different ceiling thicknesses, the flanges 706 and 806 of the caps 700 and 800 may be of different lengths, and/or may overlap the cables 170 and 470 and/or may penetrate the apertures 180 and 480 of the ceiling 402 to different extents. The length, extent of overlap and ceiling 402 penetration are not critical so long as the caps 700 and 800 removably engage cables 170 and 470, respectively.

As shown in FIG. 6, the ceiling 402 includes a first portion 190 with a thickness TI and a second portion 490 with a thickness T2. In this example, T2 is thicker than T1. In section 190, the end 192 of cable 170 extends approximately through thickness T1. The head 702 of cap 700 is approximately flush with section 190 of ceiling 402. The body 704 of the cap 700 penetrates aperture 180 and exits the upper surface 404 of ceiling 402.

In section 490, the head 802 of cap 800 is also approximately flush with section 490 of ceiling 402. However, the end 492 of cable 470 only partially penetrates thickness T2 of ceiling portion 490 as do the flanges 808 of the cap 800. Alternately or additionally, the caps 700 and 800 may include different lengths to accommodate different ceiling thicknesses T1 and T2, respectively.

While various embodiments have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for mounting a cable, the system comprising:
a ferrule fixedly coupled to the cable;
a bracket including:
 a mounting portion configured to mount the cable to a surface;
 a first flange coupled with the mounting portion and including a first aperture for receiving the cable and configured to enable rotational movement of the cable;
 a second flange coupled with the mounting portion and including a second aperture for receiving the cable; and
 an arm coupled with the mounting portion; wherein the arm and second flange are configured to receive therebetween the ferrule to enable rotational movement and limit longitudinal movement of the cable.

2. The system of claim 1 further comprising a cap configured to removably couple with an end of the cable via a friction fit.

3. The system of claim 2, wherein the cap removably couples with the end of the cable within a second surface.

4. The system of claim 1, wherein the mounting portion includes a leg configured to rest on a second surface.

5. The system of claim 1, wherein the first flange includes an angled portion configured to rest on a second surface.

6. The system of claim 1, wherein the first flange includes a tab configured to further limit lateral movement of the cable.

7. The system of claim 6, wherein the tab is configured to reduce a diameter of the first aperture.

8. The system of claim 1, wherein the arm includes a notch configured to receive the ferrule.

9. The system of claim 1, wherein the first flange is at an approximately right angle to the mounting portion.

10. The system of claim 1, wherein the arm forms an angle with the mounting portion.

11. The system of claim 1, wherein the bracket is made of a corrosion and fire resistant material.

12. The system of claim 1, wherein the bracket is made of metal.

13. The system of claim 12, wherein the metal is selected from a group comprising steel, copper, and brass.

14. The system of claim 1, wherein the bracket is made of plastic.

15. The system of claim 1, wherein the bracket is made of a composite material.

16. A method for mounting a cable, the method comprising:
securing a mounting bracket to a surface;
inserting the cable into a first flange of the mounting bracket;
inserting the cable into a ferrule;
inserting the cable into a second flange of the mounting bracket;
inserting the cable into a second surface;
fixedly coupling the ferrule to the cable;
coupling the ferrule between the first flange and an arm of the mounting bracket to longitudinally and laterally secure the cable; and
limiting the lateral movement of the cable within the second flange.

17. The method of claim 16 further comprising inserting a cap into the second surface and securing a cap to an end of the cable.

* * * * *